June 12, 1928.
J. O. MICHAUD
1,673,523
TRANSMISSION
Filed Feb. 18, 1925    2 Sheets-Sheet 1
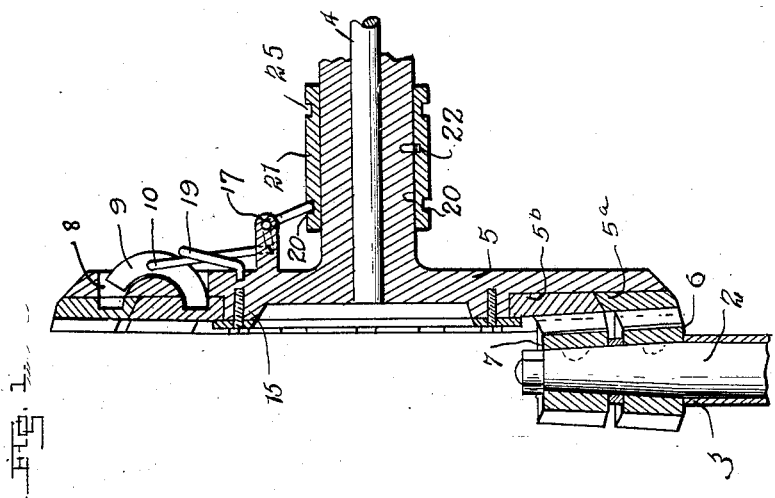
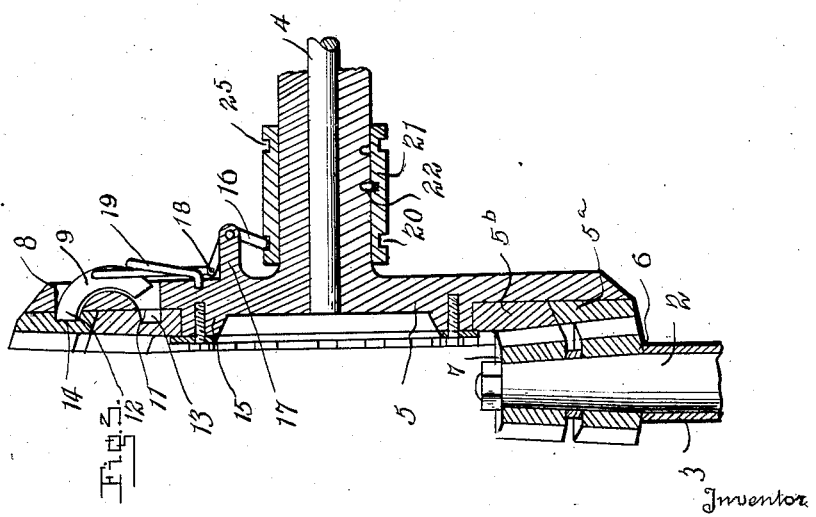
Inventor
J. O. Michaud
By Lacey & Lacey, Attorneys June 12, 1928.
J. O. MICHAUD
1,673,523
TRANSMISSION
Filed Feb. 18, 1925
2 Sheets-Sheet 2
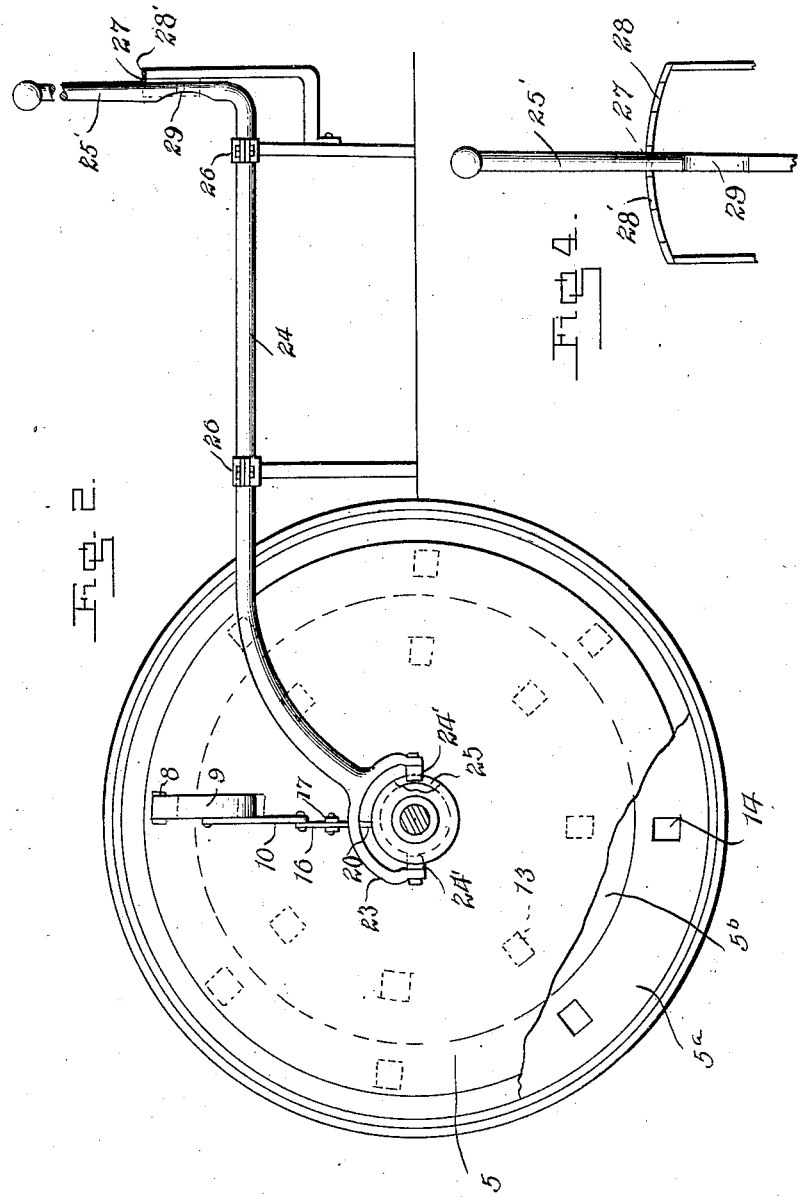
Inventor
J. O. Michaud Patented June 12, 1928.

1,673,523

UNITED STATES PATENT OFFICE.

JOSEPH OSARIO MICHAUD, OF FORT KENT, MAINE.

TRANSMISSION.

Application filed February 18, 1925. Serial No. 10,057.

This invention relates to transmissions, and while being particularly adapted to transmissions for motor vehicles, is not limited thereto.

An object of this invention is to provide an improved transmission in which the speed change is had at the rear axle of the vehicle, whereby the usual transmission case immediately at the rear of the vehicle motor may be either in whole or in part eliminated.

A further object of this invention is to simplify the structure of motor vehicle transmissions and to improve the functioning thereof as well as provide a transmission which may be constructed at a minimum cost while, at the same time wear and premature failure will be minimized.

Other objects of the invention not specifically mentioned in the foregoing will appear during the course of the following description.

In the drawings:

Figure 1 is a fragmentary longitudinal section through the rear part of a motor vehicle transmission.

Figure 2 is a view at a right angle to Figure 1 looking at the rear of the rear axle gear plate.

Figure 3 is a view similar to Figure 1, showing the inner ring gear made fast to the gear plate.

Figure 4 is a side elevation of the control lever.

Referring now more particularly to the drawings, I have shown a drive shaft at 2 and the housing therefor at 3 while a rear axle is shown at 4. Fixed to the rear axle is a gear plate 5 upon which are mounted separate gear rings $5^a$ and $5^b$, and fixed on the shaft 2 are pinions 6 and 7 meshing with said gears. The ring gears are arranged in concentric relation to the shaft 4 and are free with respect to the gear plate 5.

Formed in the gear plate 5 is an arcuate slot 8 in which slidably fits an arcuate dog 9, and connected to said dog is a link 10 for shifting the dog. Formed in the rear face of the ring gear $5^b$ to selectively receive one end of the dog is a series of circumferentially spaced sockets 13, and formed in the rear face of the ring gear $5^a$ to selectively receive the other end of the dog is a like series of sockets 14, there being preferably eight of the slots in each series. Thus, when the dog 9 is moved downwardly, for instance, said dog will follow the orbit of the slot 8 and project forwardly at one end, as at 11, into one of the sockets 13 of the ring gear $5^b$ for locking said ring gear to the gear plate 5, while, when the dog is moved upwardly, said end of the dog will be retracted and the other end thereof projected forwardly, as at 12, into one of the sockets 14 of the ring gear $5^a$, when the latter ring gear will be locked to the gear plate. The ring gears are suitably held in place, as by a shoulder 15, and, if desired, a plurality of dogs like the dog 9 may be employed.

As a control means for the link 10, I provide a bell crank 16 which is pivotally connected with the plate 5 as at 17 and with the link 10 as at 18, the link 10 being normally held yieldingly downward by a spring 19. The bell crank 16 has one arm thereof traveling in an annular slot 20 upon a sleeve 21, the sleeve 21 embracing the hub of the gear plate 5. I further provide a detent such as 22 which is pressed inwardly by a spring or other suitable means for anchoring the sleeve 21 in predetermined selective position relative to the member which it embraces.

As a means for sliding the sleeve 21, I provide a yoke 23 having inwardly projecting pins 24 which travel in a slot 25 in said sleeve. The yoke 23 forms the terminal of one arm of a bell crank 24, the other arm of which provides a lever 25', the bell crank 24 being pivoted as at 26 so that upon movement of the lever 25' the sleeve 21 is shifted, which in turn moves the link 10 and shifts the dog 9 into the desired locking position coacting with one of the gears $5^a$ and $5^b$.

The lever 25' is provided with a dog 27 adapted to selectively engage in the notches 28 of a bar 28' for locking the lever in set position. The lever is preferably of spring material and is formed with a relatively flexible reduced portion 29 so that when the lever is pulled to the left, as shown in Figure 2, the portion 29 will yield to permit the dog 27 to be retracted while, when the lever is released, the dog will be again engaged in one of the notches of the bar.

I claim:

1. A change speed mechanism for motor vehicles comprising a gear plate adapted for attachment to a rear axle, a plurality of ring gears freely mounted on said plate, drive gears meshing with said first mentioned gears, and means for selectively locking said first mentioned gears to the gear plate, said locking means including an arcuate dog slidable into locking engagement with said first mentioned gears selectively.

2. A gear locking device including a gear plate having an arcuate slot therein, an arcuate dog fitting in said slot, ring gears freely mounted on the gear plate and provided with sockets, the socket in one of said gears being disposed to receive one end of the dog and the socket in the other of said gears being disposed to receive the other end of the dog, and means for shifting the dog to engage in said sockets selectively.

3. In a vehicle transmission, in combination, a rear axle, a gear plate fixed to the rear axle and provided with a hub, a sleeve slidable on the hub, a plurality of ring gears carried by said plate, an arcuate dog slidable through the plate to selectively engage and lock said gears to the plate, a bell crank pivotally mounted on the gear plate and connected with said sleeve, a link connecting the bell crank with said dog, and means for moving the sleeve and slidably shifting said dog.

4. In a vehicle transmission, in combination, a rear axle, a gear plate fixed to the rear axle and provided with a hub, a sleeve slidable on the hub, a plurality of ring gears carried by the gear plate, an arcuate dog slidable through said plate to selectively engage and lock said gears to the gear plate, a bell crank pivotally mounted upon the gear plate and connected with said sleeve, means connecting the bell crank with said dog, a bell crank engaged at one end with the sleeve and provided at its opposite end with a lever operable for rocking the latter bell crank and shifting the sleeve to slidably shift said dog, and means for locking the lever in set position.

5. In a transmission gearing, a gear plate having an arcuate slot therein, ring gears freely mounted on the plate, and an arcuate dog slidable in said slot to alternately engage at its ends with said gears selectively for locking said gears to the plate.

6. In a transmission gearing, a gear plate, ring gears freely mounted thereon, means slidable upon the plate to alternately engage at its ends with said gears selectively for locking said gears to the plate, a pivoted bell crank connected with said means, the gear plate being provided with a hub, and a sleeve slidable upon said hub and having connection with said bell crank for rocking the bell crank and shifting said means.

7. In a transmission gearing, a gear plate, ring gears freely mounted thereon, a dog slidable upon the plate to alternately engage at its ends with said gears selectively for locking the gears to the plate, a pivoted bell crank connected with the dog, and a slidably mounted sleeve connected with the bell crank and movable for rocking the bell crank and shifting said dog.

8. In a transmission gearing, a gear plate, ring gears freely mounted thereon, a dog slidable upon the plate to alternately engage at its ends with said gears selectively for locking the gears to the plate, a pivoted bell crank connected with the dog, a slidably mounted sleeve connected with the bell crank and movable for rocking the bell crank and shifting said dog, and a lever for shifting said sleeve.

In testimony whereof I affix my signature.

JOSEPH OSARIO MICHAUD.